(12) United States Patent
Sharma et al.

(10) Patent No.: US 10,645,259 B2
(45) Date of Patent: May 5, 2020

(54) MACHINE LEARNING BASED REAL-TIME RADIATION DOSE ASSESSMENT

(71) Applicant: Siemens Healthcare GmbH, Erlangen (DE)

(72) Inventors: Puneet Sharma, Monmouth Junction, NJ (US); Saikiran Rapaka, Pennington, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 158 days.

(21) Appl. No.: 15/688,960

(22) Filed: Aug. 29, 2017

(65) Prior Publication Data

US 2018/0063386 A1 Mar. 1, 2018

Related U.S. Application Data

(60) Provisional application No. 62/381,657, filed on Aug. 31, 2016.

(51) Int. Cl.
*H04N 5/217* (2011.01)
*H04N 5/30* (2006.01)
*G01T 1/02* (2006.01)
*H04N 5/357* (2011.01)
*H04N 5/232* (2006.01)

(52) U.S. Cl.
CPC .............. *H04N 5/217* (2013.01); *G01T 1/02* (2013.01); *H04N 5/232* (2013.01); *H04N 5/3572* (2013.01)

(58) Field of Classification Search
CPC .......... G01T 1/02; H04N 5/217; H04N 5/232; H04N 5/3572
See application file for complete search history.

(56) References Cited

U.S. PATENT DOCUMENTS

2017/0177812 A1\* 6/2017 Sjolund .................. A61N 5/103

OTHER PUBLICATIONS

N. Loy Rodas, N. Padoy, 3D Global Estimation and Augmented Reality Visualization of Intra-operative X-ray Dose, Proceedings of Medical Image Computing and Computer-Assisted Intervention (MICCAI), Oral, 2014.
N. Loy Rodas, N. Padoy, Seeing Is Believing: Increasing Intraoperative Awareness to Scattered Radiation in Interventional Procedures by Combining Augmented Reality, Monte Carlo Simulations and Wireless Dosimeters, International Journal of Computer Assisted Radiology and Surgery (IJCARS), MICCAI Special Issue, vol. 10, No. 8, Aug. 2015, pp. 1181-1191.
Badal, A., & Badano, A., Accelerating Monte Carlo simulations of photon transport in a voxelized geometry using a massively parallel graphics processing unit. Medical physics, 36(11), 4878-4880. (2009).

(Continued)

*Primary Examiner* — Mark R Gaworecki

(57) ABSTRACT

A computer-implemented method for performing radiation dose assessment includes acquiring a plurality of parameters related to an image scanner configured to apply a heat or radiation dose to a subject during imaging. A plurality of features is extracted from the plurality of parameters. A dose map of a region of interest in the room is generated by applying a machine learning model to the plurality of features and the interventional room scene.

19 Claims, 6 Drawing Sheets

(56) References Cited

OTHER PUBLICATIONS

Reeves, R. R., Ang, L., Bahadorani, J., Naghi, J., Dominguez, A., Palakodeti, V., . . . & Mahmud, E., Invasive Cardiologists Are Exposed to Greater Left Sided Cranial Radiation: The BRAIN Study (Brain Radiation Exposure and Attenuation During Invasive Cardiology Procedures). JACC Cardiovascular Interventions, 8(9), 1197-1206. (2015).

Smith-Bindman, R., Lipson, J., Marcus, R., Kim, K. P., Mahesh, M., Gould, R., . . . & Miglioretti, D.L., Radiation dose associated with common computed tomography examinations and the associated lifetime attributable risk of cancer. Archives of internal medicine, 169(22), 2078-2086 (2009).

* cited by examiner

MACHINE LEARNING BASED REAL-TIME RADIATION DOSE ASSESSMENT

CROSS-REFERENCE TO RELATED APPLICATIONS

This application claims the benefit of U.S. Provisional Application Ser. No. 62/381,657 filed Aug. 31, 2016, which is incorporated herein by reference in its entirety.

TECHNICAL FIELD

The present invention relates generally to methods, systems, and apparatuses for assessing radiation doses using machine learning-based techniques. The technology described herein may be applied, for example, to provide operators with a prediction of radiation exposure for a given set of scanner parameters.

BACKGROUND

With the growing use of interventional imaging, concerns about increased exposure of the operators to ionizing radiation have become more prominent. Concern about increasing exposure to radiation is one of the biggest challenges facing radiology towards the future. Another major source of concern is studies which show a very wide degree of variation in the levels of exposure for the same procedure across different centers.

Currently, operator exposure to radiation exposure is handled by having operators wear a mobile dosimeter, such as the RaySafe i2 system. This system has been incredibly useful in increasing awareness of the radiation exposure. However, the radiation exposure is only measured at a single location. It is well known that the exposure can vary greatly across the operators' skin surface based on the C-arm angulation, the scan parameters, whether or not any shielding or protective devices are used, etc. For instance, studies indicate that the left and middle parts of the cranium received significantly higher doses than the right part for interventional cardiologists. The information provided by dosimeters, while valuable, cannot handle this heterogeneous nature of radiation distribution.

Monte-Carlo methods are considered the most accurate method of estimating the transport of radiation. Monte Carlo methods use discrete simulation of millions of individual particles (primarily photons and electrons), using stochastic models for simulating the transport of radiation along with different scattering modes like Rayleigh scattering and Compton scattering. In regions with tissue, the simulation can provide detailed information about the deposited radiation energy as the particles move through the tissue. Historically, these methods have been computationally expensive, requiring powerful supercomputers for generating results. With modern developments in computer architecture and graphical processing units (GPUs), powerful simulations can now be carried out in a few minutes on standard computing workstations.

For applications such as radiation therapy planning, where there is no urgent clinical need for real-time dose computation, such GPU based Monte Carlo simulation engines are sufficient. However for real-time applications that typically arise during image acquisition, such as planning an X-ray based image acquisition (e.g., Computed Tomography, C-arm CT etc.), dose calculation that take multiple minutes are not practical. In a dynamic operating environment, there is a need to update (in real-time) the dose map in an imaging room to alert the operators and provide real-time feedback on the dose received by the patients and/or by the operator.

SUMMARY

Embodiments of the present invention address and overcome one or more of the above shortcomings and drawbacks by providing methods, systems, and apparatuses related to a real-time accurate dose computation based on a machine-learning algorithm.

According to some embodiments, a computer-implemented method for performing radiation dose assessment includes acquiring a plurality of parameters related to an image scanner configured to apply a heat or radiation dose to a subject during imaging. A plurality of features is extracted from parameters. A dose map of a region of interest in the room is generated by applying a machine learning model to features and the interventional room scene. This region of interest may be specified, for example, by a user of the image scanner. If any of the parameters change, updated features may be extracted from the updated parameters and the dose map of the room can be updated applying the machine learning model to the updated features.

In some embodiments of the aforementioned method, the dose map comprises a visualization of the room overlaid by a heat map indicating areas of high dosage. In these embodiments, the method may further include presenting the dose map on a display. Additionally, in some embodiments, a location of an operator within the room is monitored and, in response to detecting that the operator is within an area of high dosage, an alarm is generated for the operator. For example, an auditory alarm may be triggered in the room and/or a visual alarm may be presented on a display viewable by the operator. In other embodiments, the location of an operator within the room is monitored and the time period that the operator has been within one or more of the areas of high dosage is determined. If the time period exceeds a predetermined threshold, an alarm may be generated for the operator. In some embodiments, a projection of the dose map is created on a floor area of the room. This projection indicates high dose area and low does areas on the floor area.

In some embodiments, the aforementioned method further comprises determining an interventional room scene corresponding to a room in which the image scanner is operating. The dose map of the region of interest in the room may then be generated by applying a machine learning model to both the features and the interventional room scene. The interventional room scene may be determined, for example, by imaging the room with an RGB camera and a depth sensor. Additionally, as the interventional room scene is updated, the dose map of the room can be updated accordingly by applying the machine learning model to the features and the updated interventional room scene.

In some embodiments, devices such as dosimeters may be used to enhance dose measurement. For example, in one embodiment, a measured dose experienced by the operator via a dosimeter within the room is received. A predicted dose for the operator may be determined based on the dose map. Based on the error between the measured dose and the predicted dose, the parameters may be updated accordingly.

According to another aspect of the present invention, a second method for performing radiation dose assessment includes training a machine learning model to map features that characterize a geometric model to a dose metric. These features comprise geometric measurements of a subject's body surface and internal organs. During an imaging procedure, the machine learning model is used to generate a dose map of a room in which the imaging procedure is being performed. The input to the machine learning model comprises (a) features related to an image scanner configured to apply a heat or radiation dose to a subject during the imaging procedure and (b) an interventional room scene corresponding to a room in which the image scanner is operating.

Various types of model data may be included in the geometric model discussed above, and the features can be adjusted accordingly. For example, in some embodiments, the geometric model includes image scanner geometric model and the features comprise one or more of tube current, tube voltage, collimation, C-arm angle, exposure, distance to an imaging table, and distance to iso-center of the image scanner. In other embodiments, the geometric model comprises an anatomical model of operators of the image scanner and the features comprise one or more of a number of operators, operator locations in the room, and an indication of shielding device worn by the operators. In another embodiment, the geometric model includes geometric models of non-scanner equipment located in the room and the features comprise geometric features characterizing the shape, size, and configuration of the room.

Some embodiments of the aforementioned second method further comprise performing a plurality of Monte Carlo simulations for radiation transport at a plurality of operating points of the image scanner to generate ground truth data. These operating points may include, for example, one or more of tube current, voltage, collimation, and distance to iso-center of the image scanner. The machine learning model may be trained using the ground truth data. In some embodiments, the Monte Carlo simulations are performed for a plurality of room configurations. In other embodiments, the Monte Carlo simulations are performed for a plurality of patient models.

In one embodiment of the second method for performing radiation dose assessment, images of a phantom are acquired using the image scanner. During acquisition of the images, dose measurements are acquired using a plurality of dose sensors distributed in the room. The machine learning model may then be trained using dose measurements.

In other embodiments of the second method for performing radiation dose assessment, 3D mesh models representative of anatomical organs are generated based on 3D image data acquired from a plurality of subjects. For each 3D mesh model, a physics based radiation dose computation engine may be used to compute ground truth dose metrics for parameters associated with the image scanner. Then, the machine learning model may be trained using the ground truth dose metrics. In some embodiments, synthetic anatomical models may be used in addition to (or as an alternative to) the aforementioned 3D mesh models.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawing. For the purpose of illustrating the invention, there are shown in the drawing embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to the real-time accurate dose computation based on a machine-learning algorithm. In contrast to the traditional dose computation algorithms that rely on simulating the physics of the radiation transport, the techniques described herein are purely a data-driven approach and can be used in a real-time setting. The dose estimate method described herein is performed in two phases: the training phase and the prediction phase. The former trains a machine learning model to predict dose metrics based on a training database of anatomical models and, in some embodiments, models of the layout of rooms in which the image scanner operates (i.e., the interventional room scene). The prediction phase uses the trained model to generate a dose map during imaging using the real-world anatomy and possibly other factors (e.g., the real-world interventional room scene).

The term "dose," as used herein, refers to various types of use cases: skin dose to the patient, organ dose to the patient, skin dose to the operator in the imaging room (e.g., in a cathlab, hybrid operation room or a surgery room), organ-level dose to the operator, or a 3D dose map in an imaging room. In its most general sense, the term "dose" refers to the radiation dose from an X-ray like system (with an x-ray tube and a detector). The techniques described herein can also be generalized for other dose such as heat dose to the tissue from a Magnetic Resonance (MR) scanner or an ultrasound device.

Figure 1:
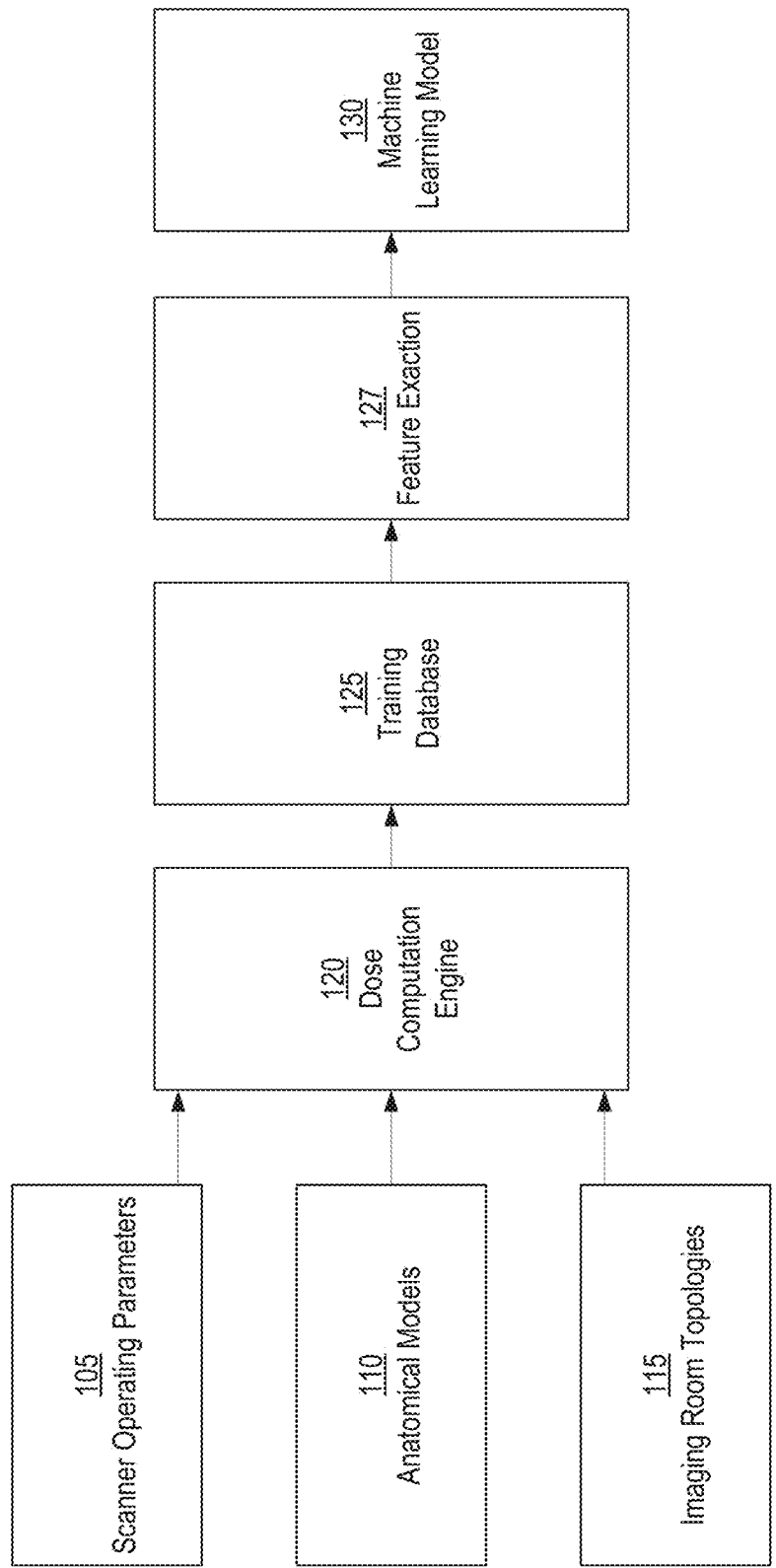
FIG. 1 illustrates the training phase of the machine-learning based dose estimate method, according to some embodiments of the present invention.

FIG. 1 illustrates the training phase of the machine-learning based dose estimate method, according to some embodiments of the present invention. This training phase is performed offline, during which a Training Database 125 of geometric models and corresponding dose metrics are first assembled using a Dose Computation Engine 120. The input to the Dose Computation Engine 120 are Scanner operating parameters 105; Anatomical Models 110 (either subject-specific models or models corresponding to a population of subjects); and Imaging Room Topologies 115. The output of the Dose Computation Engine 120 is a dose metric. The dose metric can comprise any metric that is used to qualitatively or quantitatively measure the dose for a particular combination of Scanner Operating Parameters 105, Anatomical Models 110, and Imaging Room Topologies 115. For example, the dose metric may refer to the effective dose, peak skin dose, total air kerma, air kerma area product, Computed Tomography Dose Index (CTDI), CTDI volume, CTDI weighted, Dose-Length Product (DLP), size-specific dose estimate (SSDE), etc.

In the Training Database 125, each sample (i.e., entry) may be represented by a number of features that characterize the Scanner Operating Parameters 105, Anatomical Models 110, and Imaging Room Topologies 115. The Scanner Operating Parameters 105 generally include any parameters used in operating an imaging scanner. Sets of parameters may be associated with a particular image scanner model or group of models. In some embodiments, specific combinations of parameter values are specified in the Scanner Operating Parameters 105 (e.g., corresponding to particular studies or other imaging applications). In other embodiments, the Scanner Operating Parameters 105 specify ranges of valid values for all available parameters available on the image scanner. It should be noted that the Scanner Operating Parameters 105 may include both user-modifiable parameters (i.e., those parameters that can be changed prior to a scan), as well as parameters that are hardcoded or otherwise un-modifiable by the user.

The Anatomical Models 110 may comprise one or more combinations of the following: an anatomical model of a subject's body; an anatomical model of a subject's internal organs; and/or an anatomical model of the operator(s). In some embodiments, the Anatomical Models 110 may comprise anatomical models of various subjects extracted from their respective medical imaging scans. For such extraction, image segmentation algorithms may be used to delineate various organs and build a 3D anatomical model (e.g., a 3D mesh) for a particular patient. In another embodiment of the invention, the Anatomical Models 110 can be generated purely synthetically, i.e., without using any patient-specific scan data. The synthetic anatomical model of the subject to be scanned could have either a physical (in-vitro) or a digital (in-silico) representation (generated and stored on a computer). The synthetic anatomical model could be a full-body model, or only focused on a particular anatomical part of the body.

There are a number of advantages in using a purely synthetic data generation approach. First, it allows the possibility to train on a very large database of cases, which would otherwise be prohibitively expensive to setup if real patients data is needed. Secondly, a purely synthetic data generation approach allows us to sample both, the mainstream cases and the 'corner' cases (i.e., one that does not occur frequently in the clinical use case). Third, a purely synthetic data generation approach can be tailored towards a particular clinical use case by just changing the underlying synthetic model generation algorithm. To generate synthetic anatomical models, different approaches can be used. In some embodiments, one or more baseline models are generated. The properties of these models are then randomly or systematically perturbed to obtain a large number of models. In other embodiments, each model is generated separately by following a set of rules and by randomly or systematically perturbing the parameter values of these rules. The same concept can be extended to synthetically generate 3D models of the scan room and other ancillary equipment in the scan room included in the Imaging Room Topologies 115.

The Imaging Room Topologies 115 may comprise one or more combinations of the following: a geometric model of the imaging device (e.g., the C-arm system, CT scanner, etc.); a geometric model of the imaging room; and/or a geometric model of non-scanner equipment in the imaging room (e.g., surgical tables, ultrasound machine, anesthesia equipment, scan shielding devices, etc.).

The Dose Computation Engine 120 is a physics based radiation dose computation engine that can be used to compute the various dose metrics based on one or more of the Scanner Operating Parameters 105, Anatomical Models 110, and Imaging Room Topologies 115. In some embodiment, it performs a plurality of numerical simulations (e.g., Monte Carlo methods for radiation transport) that can be executed various operating points of the imaging device (e.g., tube current, voltage, collimation, distance to iso-center, etc.), room configuration, patient model, etc. As an alternative or supplement to the use of numerical simulations in some embodiments, the dose metric can be determined by performing phantom experiments on the imaging device and measure the dose metric with physical radiation dose sensors that can be mounted on the surface or embedded under the surface of the phantom. These dose sensors can also be placed at different locations in the imaging room, or be worn by the operators.

The results of the Dose Computation Engine 120 are stored in the Training Database 125, along with the Scanner Operating Parameters 105, Anatomical Models 110, and Imaging Room Topologies 115. The Training Database 125 described herein may be implemented using any technique known in the art. For example, in some embodiments, an SQL-based database such as Microsoft SQL Server may be used. In other embodiments No-SQL database with a table equivalent structure may be employed. As is understood in the art, the term "No-SQL" is used to define a class of data stores that are non-relational in their design. There are various types of No-SQL databases which may be generally grouped according to their underlying data model. These groupings may include databases that use column-based data models (e.g., Cassandra), document-based data models (e.g., MongoDB), key-value based data models (e.g., Redis), and/or graph-based data models (e.g., Allego). Any type of No-SQL database may be used to implement the various embodiments described herein. For example, in one embodiment, MongoDB software is used to provide the underlying functionality of the database.

The data in the Training Database 125 is used for training the Machine Learning Model 130. The data may be used directly in training the Machine Learning Model 130. Alternatively, as shown in the example of FIG. 1, a Feature Extraction 127 component may be used to extract relevant features from the Scanner Operating Parameters 105, Anatomical Models 110, and Imaging Room Topologies 115. Then, the Machine Learning Model 130 can be trained on the dose metric and the corresponding features from the inputs used to generate that metric. In some embodiments, the features can be "hand-crafted," (i.e., chosen a-priori from domain knowledge). In other embodiments, the features may be learned and chosen automatically by the machine learning algorithm. In still other embodiments, a combination of hand-crafter and learned features may be used.

The features extracted by the Feature Extraction 127 component could be numeric, categorical, textual, nominal, ordinal, or binary. One example set of features are the geometric measurements of the subjects' body surface and internal organs. These may be basic quantities quantifying the shape, size, location, material property (e.g., properties of the various tissues), or more complex relationships of these basic quantities. Features of the imaging device can be quantities such as the tube current, tube voltage, collimation, C-arm angle, exposure, distance to the table, distance to the iso-center, or other geometric measurements that may be extracted from a 3D CAD model of the imaging device. Features representing the imaging room may comprise geometric features characterizing the shape, size and configuration of the room. This may also include binary features such as absence (or presence) of a radiation shielding device, absence or presence of a certain equipment in the room (for example: an anesthesia machine). Features representing the operators in the imaging room can comprise the number of operators, their respective locations in the room, binary features such as the presence or absence of shielding devices they might be wearing, the type of shielding device, etc.

After the features and the corresponding dose metric for the input data is extracted, the subsequent step is to train the Machine Learning Model 130 to predict the dose metric for a new (unseen) dataset. For this purpose, any type of machine learning model which enables supervised learning may be used, from the following categories (but not limited to): Deep learning, regression, Instance-based Methods, Regularization Methods, Decision Tree Learning, Bayesian, Kernel Methods, Clustering Methods, Association Rule Learning, Artificial Neural Networks, Dimensionality Reduction, and Ensemble Methods. Furthermore, a subset of the extracted features may be used for learning, as determined from feature selection and ranking, feature combination, etc. Techniques for training machine learning models such as those discussed above are generally known in the art and, thus, the specific details of training the model have been omitted here.

Figure 2:
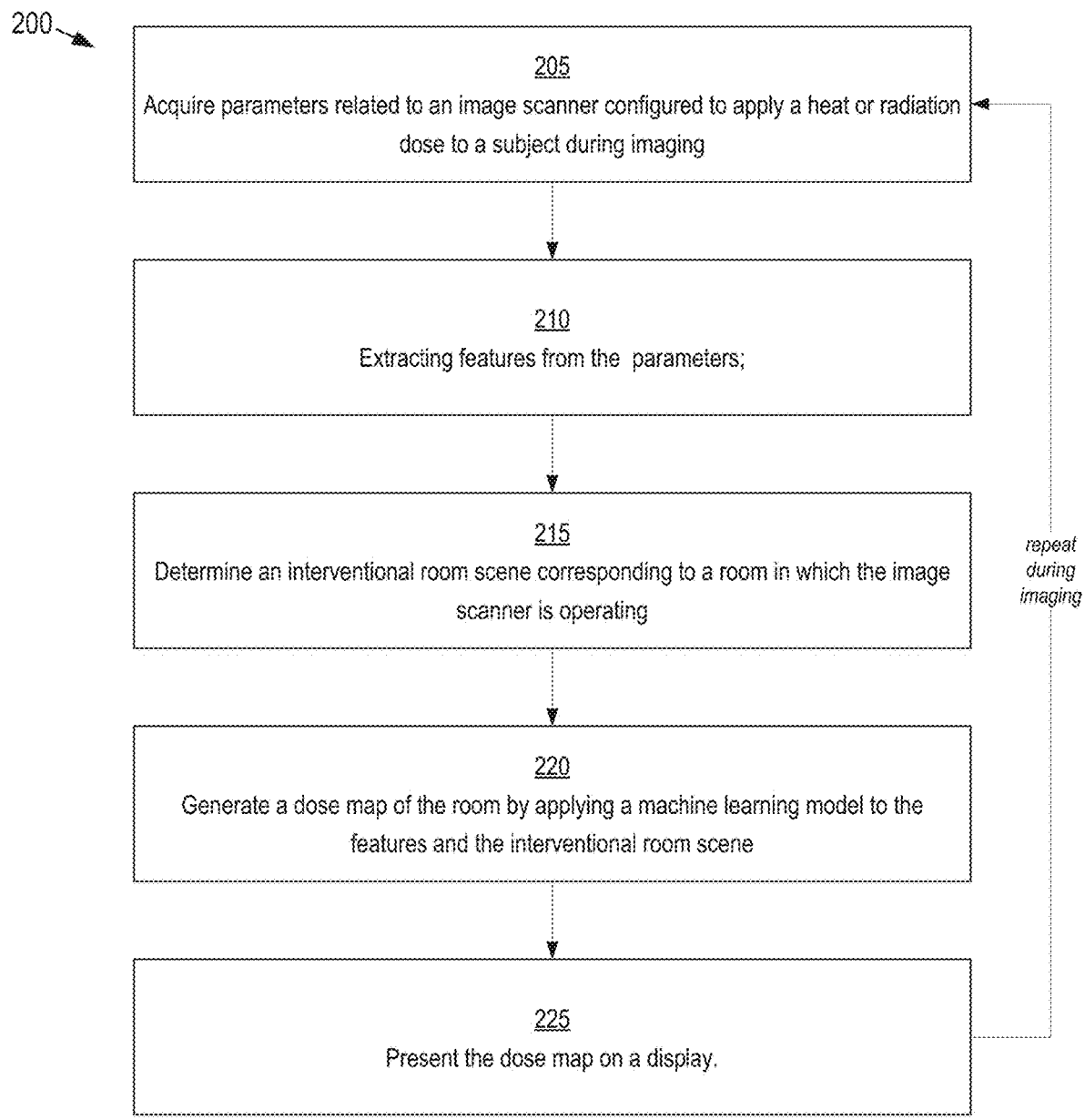
FIG. 2 a dose prediction method which is performed using the trained machine learning model discussed above, according to some embodiments.

FIG. 2 a dose prediction method 200 which is performed using the trained machine learning model discussed above, according to some embodiments. This method 200 is intended to be performed as an online process, whereby the value of the dose metric is computed for a new data (unseen data), by using the learned mapping from the training phase. To achieve this, first the required features are extracted from the new dataset, the values of which are then used as an input to the pre-learned model.

The method 200 starts at step 205 where parameters related to the image scanner are acquired. These parameters ultimately configure the scanner to apply a heat or radiation dose to a subject during imaging. The parameters may be based, for example, on information provided by the operator in preparation of performing the image scan. In some instances, the parameters may be derived based on operator input. For example, the operator may input information for configuring the image scanner for a particular type of study and the parameters can be derived by the image scanner. At step 210, a plurality of features is extracted from the parameters. Feature extraction may be performed in the same manner as discussed above with respect to FIG. 1.

At step 215, the interventional room scene corresponding to a room in which the image scanner is operating is determined. The interventional room scene is a 2D or 3D representation of the room. This scene may be captured prior to imaging or, in some embodiments, the scene may be captured during imaging to allow real-time updating of the dose map (described below with respect to step 220). In some embodiments, the room may be configured with a specialized camera system for capturing the scene. For example, in one embodiment, an RGB camera and a depth sensor are installed on the ceiling of the room. It should be noted that, while step 215 provides room-level information regarding the dose, the interventional room scene is not necessarily required for all use cases. For example, if only the patient dose is of interest for a particular dose analysis application, knowledge of the entire interventional room scene is not required.

Next, at step 220 a dose map of the room is generated by applying the trained machine learning model to the features and the interventional room scene. More specifically, the machine learning model is used to determine a dose metric for each point within the interventional room scene. To facilitate processing of the room, the interventional room scene may be decomposed into a plurality of regions. Then, a dose metric may be determined for each region. The dose metrics may then be combined to provide the complete dose map of the room. The size of each region may be selected based on the computational capabilities of the computing model implementing the method. That is, smaller regions may be used where a fairly robust computing platform is available (see, e.g., FIG. 5), while larger regions may be used where less computational resources are available (e.g., on a desktop computer or mobile device).

Figure 3A:
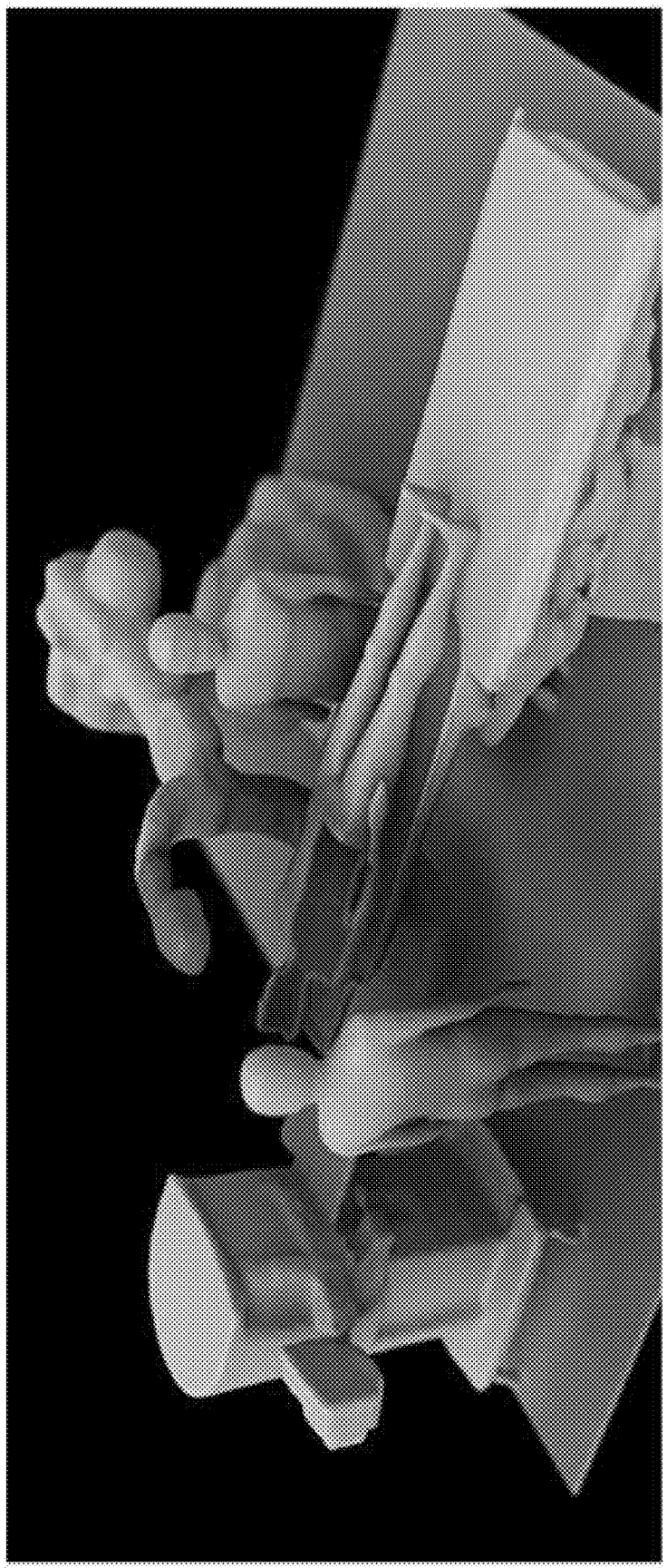
FIG. 3A provides an example visualization of the dose map with the heat-map as may be generated in some embodiments.
Figure 3B:
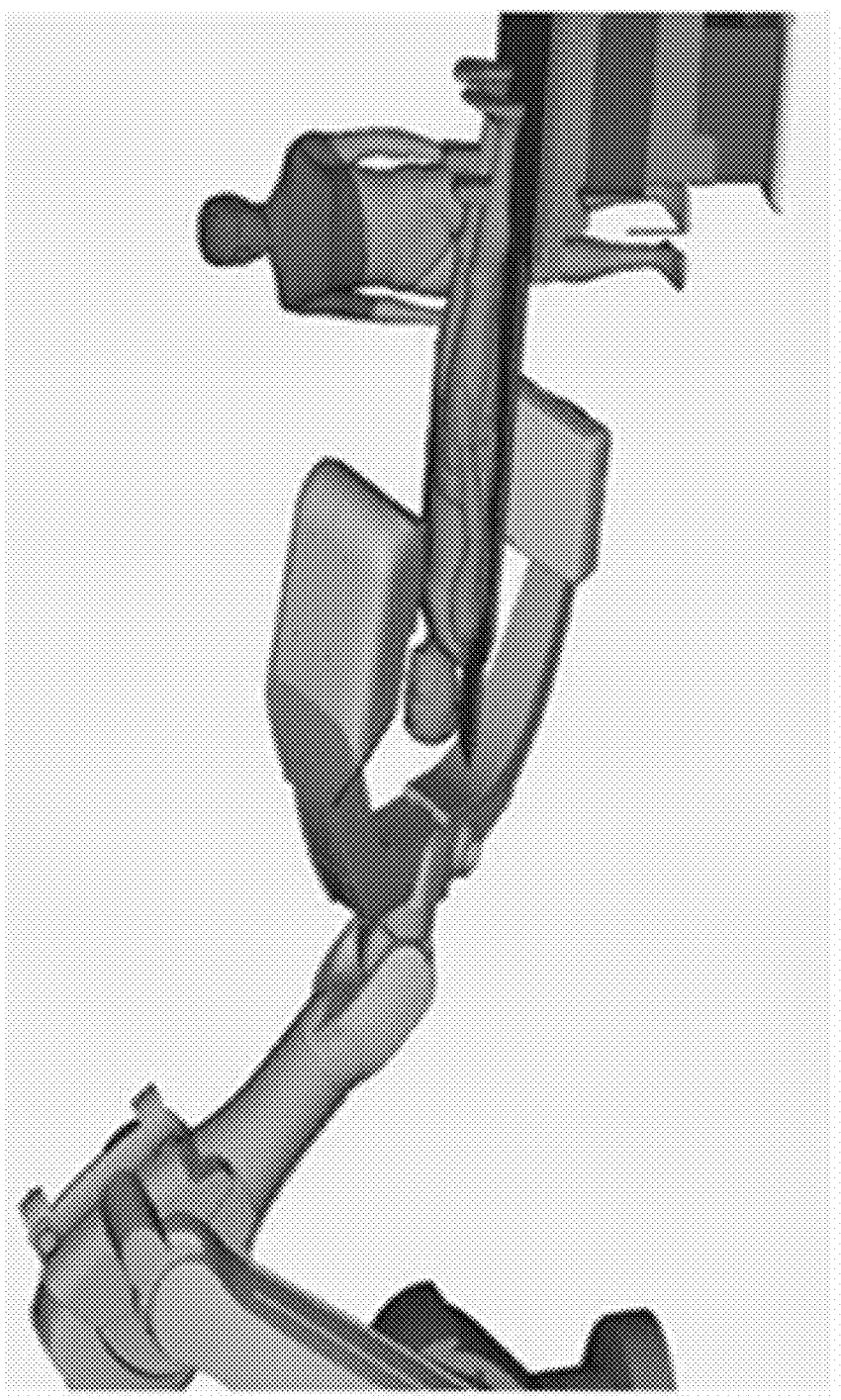
FIG. 3B provides a second example visualization where the operator dose is visualized for a specific C-arm angulation and imaging parameters, according to some embodiments.

Then, at step 225, the dose map is presented on a display. Various techniques may be used for visualizing the dose map. The dose map can be visualized as a "heat-map" on a patient's 3D model and displayed on a monitor for the operators to view it, and take any corrective action if they see fit. FIG. 3A provides an example visualization of the dose map with the heat-map that shows the range of dose from high to low with colors ranging from red to green (shown in grayscale in FIG. 3A, with dark gray corresponding to high dosage and light gray corresponding to low dosage). FIG. 3B provides a second example visualization where the operator dose is visualized for a specific C-arm angulation and imaging parameters. This example demonstrates how an operator-specific view may be used to provide the operator with a personalized prediction of the dose that will be received during an imaging procedure. In some embodiments, this dose map may aggregate the predicted dose with other doses previously experienced by the operator (e.g., acquired via a dosimeter on the operator's person). In this way, safety measures may be implemented to ensure that the operator's dose remains below a threshold to ensure operator safety. For example, if the dose map predicts that the operator will exceed a safe dose during the imaging procedure, the operator may be prevented from performing the imaging procedure (e.g., the image scanner may require a new operator to log-in to the system). Alternatively, the imaging scanner may require the operator to reposition himself or herself within the imaging room to minimize the dose impacting the operator.

In addition to producing a heat map of the room, in some embodiments, a visual or audio alarm may be triggered when an operator enters a high dose area, or spends a specified amount of time (or cumulative exposure) in such an area. For such a visualization, the real-time location of the operators may be available from a camera mounted in the imaging room, or could be approximated from position sensors (or any other sensors with a similar capability) that the operators may be wearing. Alternatively, the dose map may be visualized with the aid of augmented reality devices such as a headset with AR display. The dose map could also be visualized on the floor of the imaging room by projecting patterns on the floor clearly marking the areas of low and high dose. These patterns can be updated in real-time once the C-arm angulation and scan parameters are changed during the course of the intervention.

The method 200 may be repeated during imaging to update the dose map in real-time. For example in case of a C-arm system used in a hybrid OR, the trained machine learning model can predict a live dose map of the radiation in the OR room, radiation exposure to the skin and organ of the patient and the radiation exposure of the various operators. When the imaging parameters are changed (e.g., C-arm rotates to a new angulation, or the tube current changes to a different value, or an operator moves in the room), the dose map can be updated in real time by re-computing the machine learning model with the updated features.

In some embodiments, during a procedure, a log file is generated with scanner data and any data collected by cameras in the room storing the scanner. Later, the logs can be analyzed to determine, for example, what kinds of exposure the operators received and the key factors (if any) that caused higher than average exposure for such procedures. This log-based process may be employed, for example, by a facility to periodically determine how the safety of scanner operations may be improved.

Figure 4:
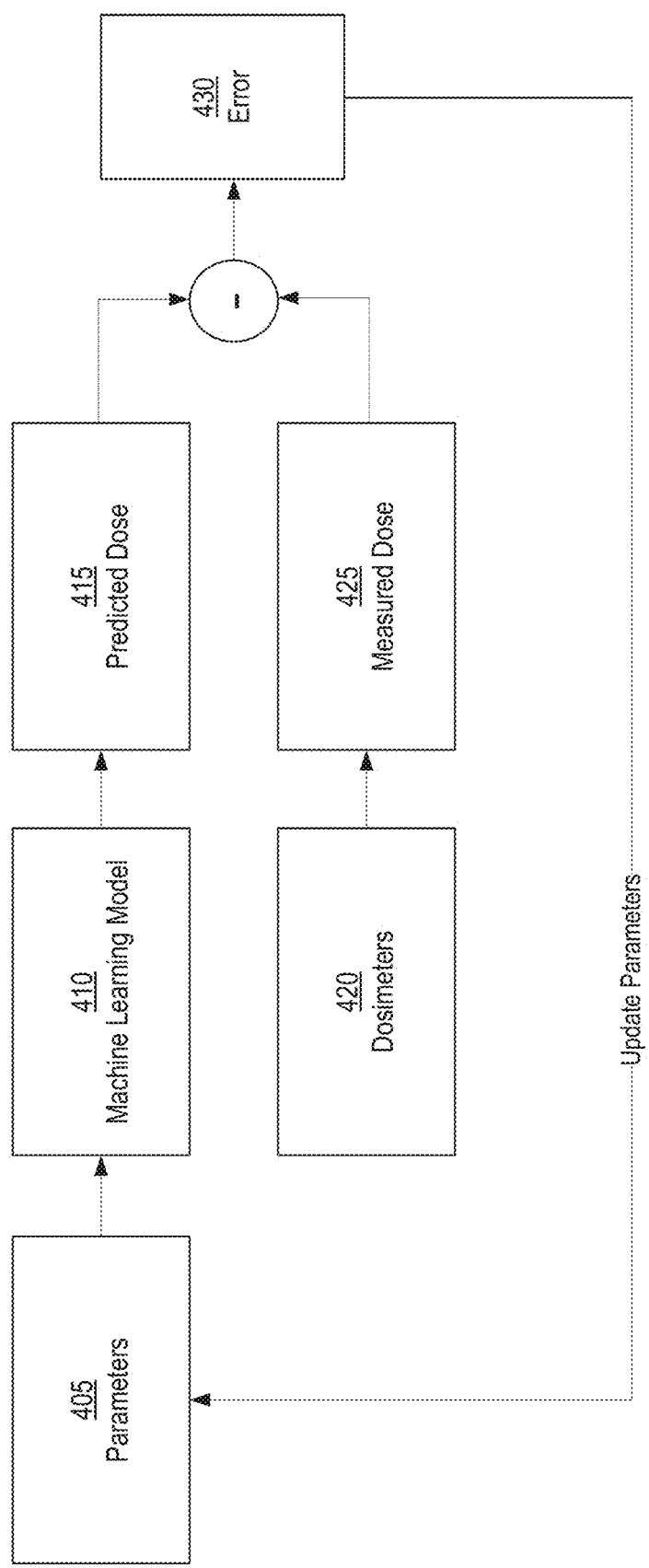
FIG. 4 illustrates a framework for continuous data assimilation that may be used in some embodiments.

Various additional extensions and variations to the techniques discussed above can be applied in different embodiments. For example, in one embodiment, the dose computation model provides detailed distribution of radiation in the entire imaging room. In other embodiments, knowledge of operator positions from cameras can enable real-time exposure monitoring for the operators. In addition to being a real-time system, the proposed system may also be used for an offline analysis of the dose during a procedure (e.g., for benchmarking and quality assurance purposes). Additionally, any available dosimeter measurements can be integrated in the dose computation model for increased robustness and calibration as shown in FIG. 4. Here, Parameters 405 are used to generate the Machine Learning Model 410 which, in turn, is used to generate a Predicted Dose 45. Dosimeters 420 acquire measurements of the Measured Dose 425. The difference between the Predicted Dose 45 and the Measured Dose 425 is considered the Error 430 which may then be used to adjust the Parameters 405.

Figure 5:
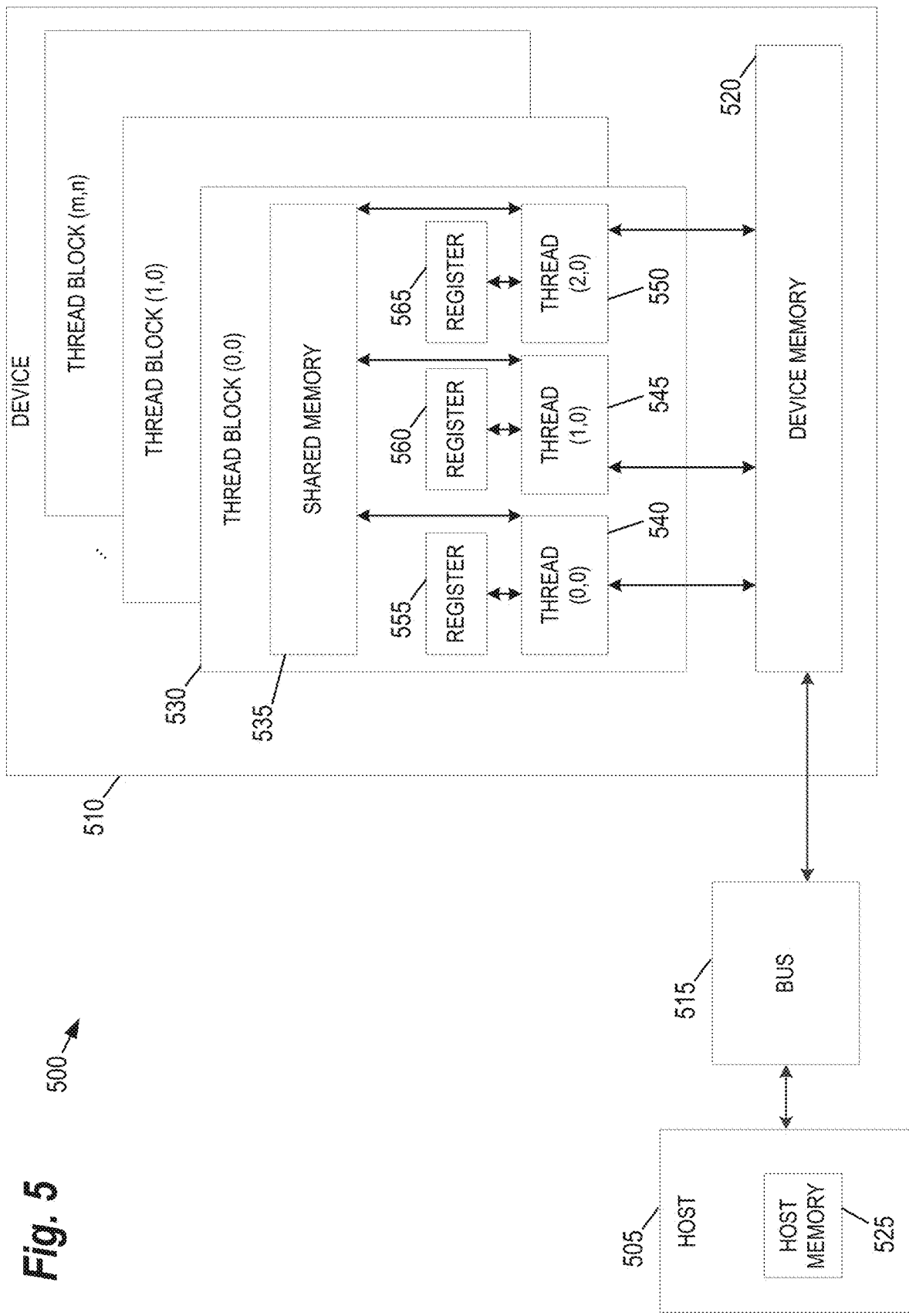
FIG. 5 provides an example of a parallel processing memory architecture that may be utilized to implement the machine learning models and other aspects of the various workflows discussed herein.

FIG. 5 provides an example of a parallel processing memory architecture 500 that may be utilized to implement the machine learning models and other aspects of the various workflows discussed herein. For example, this architecture may be used to perform Monte Carlo simulations for radiation transport for various operating points of the imaging device, as well as various room configurations, in parallel. Additionally, during the online prediction phase, this architecture 500 may be used to generate the dose map and update in real-time during the imaging procedure.

This architecture 500 may be used in embodiments of the present invention where NVIDIA CUDA™ (or a similar parallel computing platform) is used. The architecture includes a host computing unit ("host") 505 and a graphics processing unit (GPU) device ("device") 510 connected via a bus 515 (e.g., a PCIe bus). The host 505 includes the central processing unit, or "CPU" (not shown in FIG. 5), and host memory 525 accessible to the CPU. The device 510 includes the graphics processing unit (GPU) and its associated memory 520, referred to herein as device memory. The device memory 520 may include various types of memory, each optimized for different memory usages. For example, in some embodiments, the device memory includes global memory, constant memory, and texture memory.

Parallel portions of a big data platform and/or big simulation platform (see FIG. 5) may be executed on the architecture 500 as "device kernels" or simply "kernels." A kernel comprises parameterized code configured to perform a particular function. The parallel computing platform is configured to execute these kernels in an optimal manner across the architecture 500 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below). Using concurrent kernel execution, streams, and synchronization with lightweight events, the architecture 500 of FIG. 5 (or similar architectures) may be used to parallelize portions of the model based operations performed in training or utilizing the machine learning model discussed herein.

The device 510 includes one or more thread blocks 530 which represent the computation unit of the device 510. The term thread block refers to a group of threads that can cooperate via shared memory and synchronize their execution to coordinate memory accesses. For example, in FIG. 5, threads 540, 545 and 550 operate in thread block 530 and access shared memory 535. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 5, the thread blocks 530 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints.

Continuing with reference to FIG. 5, registers 555, 560, and 565 represent the fast memory available to thread block 530. Each register is only accessible by a single thread. Thus, for example, register 555 may only be accessed by thread 540. Conversely, shared memory is allocated per thread block, so all threads in the block have access to the same shared memory. Thus, shared memory 535 is designed to be accessed, in parallel, by each thread 540, 545, and 550 in thread block 530. Threads can access data in shared memory 535 loaded from device memory 520 by other threads within the same thread block (e.g., thread block 530). The device memory 520 is accessed by all blocks of the grid and may be implemented using, for example, Dynamic Random-Access Memory (DRAM).

Each thread can have one or more levels of memory access. For example, in the architecture 500 of FIG. 5, each thread may have three levels of memory access. First, each thread 540, 545, 550, can read and write to its corresponding registers 555, 560, and 565. Registers provide the fastest memory access to threads because there are no synchronization issues and the register is generally located close to a multiprocessor executing the thread. Second, each thread 540, 545, 550 in thread block 530, may read and write data to the shared memory 535 corresponding to that block 530. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 510 to read and/or write to the device memory. Device memory requires the longest time to access because access must be synchronized across the thread blocks operating on the device. Thus, in some embodiments, the room can be divided into regions and each the dose of each region can be mapped in parallel using register memory, with shared and device memory only being used as necessary to combine the results to provide the results for the complete dose map.

The embodiments of the present disclosure may be implemented with any combination of hardware and software. For example, aside from parallel processing architecture presented in FIG. 5, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for performing radiation dose assessment, the method comprising:
   acquiring a plurality of parameters related to an image scanner configured to apply a heat or radiation dose to a subject during imaging in a room;
   extracting a plurality of features from the plurality of parameters;
   generating a dose map of a region of interest in the room by applying a machine learning model to the plurality of features wherein the dose map comprises a visualization of the room overlaid by a heat map indicating areas of high dosage;
   presenting the dose map on a display;
   monitoring a location of an operator within the room; and
   in response to detecting that the operator is within an area of high dosage, generating an alarm for the operator.

2. The method of claim 1, wherein the region of interest is specified by a user of the image scanner.

3. The method of claim 1, further comprising:
   monitoring a location of an operator within the room;
   determining a time period that the operator has been within one or more of the areas of high dosage;
   if the time period exceeds a predetermined threshold, generating an alarm for the operator.

4. The method of claim 1, further comprising:
   creating a projection of the dose map on a floor area of the room, wherein the projection indicates high dose area and low does areas on the floor area.

5. The method of claim 1, further comprising:
   detecting a change to the plurality of parameters related to the image scanner;
   in response to detecting the change, extracting a plurality of updated features from the plurality of parameters; and
   generating an updated dose map of the room by applying the machine learning model to the plurality of updated features.

6. The method of claim 1, further comprising:
   determining an interventional room scene corresponding to a room in which the image scanner is operating, wherein
   the dose map of the region of interest in the room is generated by applying a machine learning model to the plurality of features and the interventional room scene.

7. The method of claim 6, further comprising:
   determining an update to the interventional room scene corresponding to the room in which the image scanner is operating; and
   generating an updated dose map of the room by applying the machine learning model to the plurality of features and the updated interventional room scene.

8. The method of claim 6, wherein the interventional room scene is determined by imaging the room with an RGB camera and a depth sensor.

9. The method of claim 1, further comprising:
   receiving a measured dose experienced by the operator via a dosimeter within the room;

determining a predicted dose for the operator based on the dose map;

determining an error between the measured dose and the predicted dose; and updating the plurality of parameters based on the error.

10. A computer-implemented method for performing radiation dose assessment, the method comprising:

training a machine learning model to map features that characterize a geometric model of a dose metric, wherein the features comprises geometric measurements of a subject's body surface and internal organs;

during an imaging procedure, using the machine learning model to generate a dose map of a room in which the imaging procedure is being performed, wherein input to the machine learning model comprises (a) features related to an image scanner configured to apply a heat or radiation dose to a subject during the imaging procedure and (b) an interventional room scene corresponding to a room in which the image scanner is operating.

11. The method of claim 10, wherein the geometric model further comprises an image scanner, geometric model and the features comprise one or more of tube current, tube voltage, collimation, C-arm angle, exposure, distance to an imaging table, and distance to iso-center of the image scanner.

12. The method of claim 10, wherein the geometric model further comprises an anatomical model of operators of the image scanner and the features comprise one or more of a number of operators, operator locations in the room, and an indication of shielding device worn by the operators.

13. The method of claim 10, wherein the geometric model further comprises geometric models of non-scanner equipment located in the room and the features comprise geometric features characterizing the shape, size, and configuration of the room.

14. The method of claim 10, further comprising:

performing a plurality of Monte Carlo simulations for radiation transport at a plurality of operating points of the image scanner to generate ground truth data, wherein the plurality of operating points comprise one or more of tube current, voltage, collimation, and distance to iso-center of the image scanner, wherein the machine learning model is trained using the ground truth data.

15. The method of claim 14, wherein the plurality of Monte Carlo simulations are performed for a plurality of room configurations.

16. The method of claim 14, wherein the plurality of Monte Carlo simulations are performed for a plurality of patient models.

17. The method of claim 14, further comprising:

acquiring a plurality of images of a phantom using the image scanner;

during acquisition of the images, acquiring a plurality of dose measurements using a plurality of dose sensors distributed in the room, wherein the machine learning model is trained using the plurality of dose measurements.

18. The method of claim 14, further comprising:

generating a plurality of 3D mesh models representative of a plurality of anatomical organs based on 3D image data acquired from a plurality of subjects;

for each 3D mesh model, using a physics based radiation dose computation engine to compute a plurality of ground truth dose metrics for a plurality of parameters associated with the image scanner, wherein the machine learning model is trained using the ground truth dose metrics.

19. The method of claim 14, further comprising:

generating a plurality of synthetic anatomical models representative of a plurality of subjects;

for each synthetic anatomical model, using a physics based radiation dose computation engine to compute a plurality of ground truth dose metrics for a plurality of parameters associated with the image scanner, wherein the machine learning model is trained using the ground truth dose metrics.

* * * * *